Figure 1:
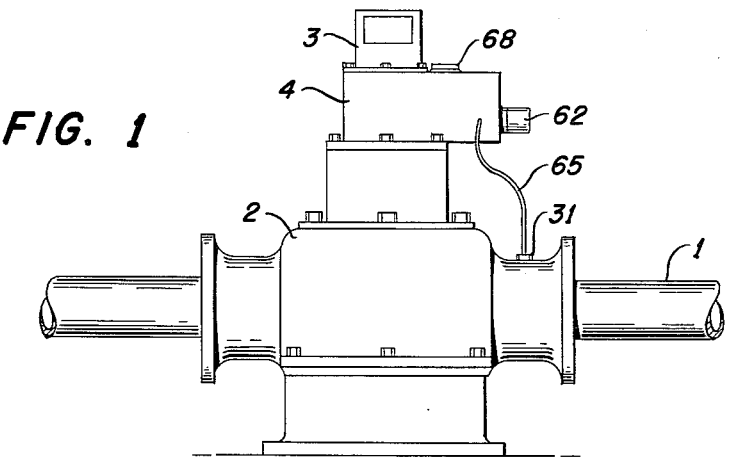

May 7, 1963 W. E. STEEN 3,088,317
TEMPERATURE AND COEFFICIENT EXPANSION COMPENSATORS
FOR LIQUID FLOW RECORDERS
Filed Feb. 15, 1960 3 Sheets-Sheet 1

INVENTOR.
WILLIAM E. STEEN
BY
Andrus & Starke
Attorneys

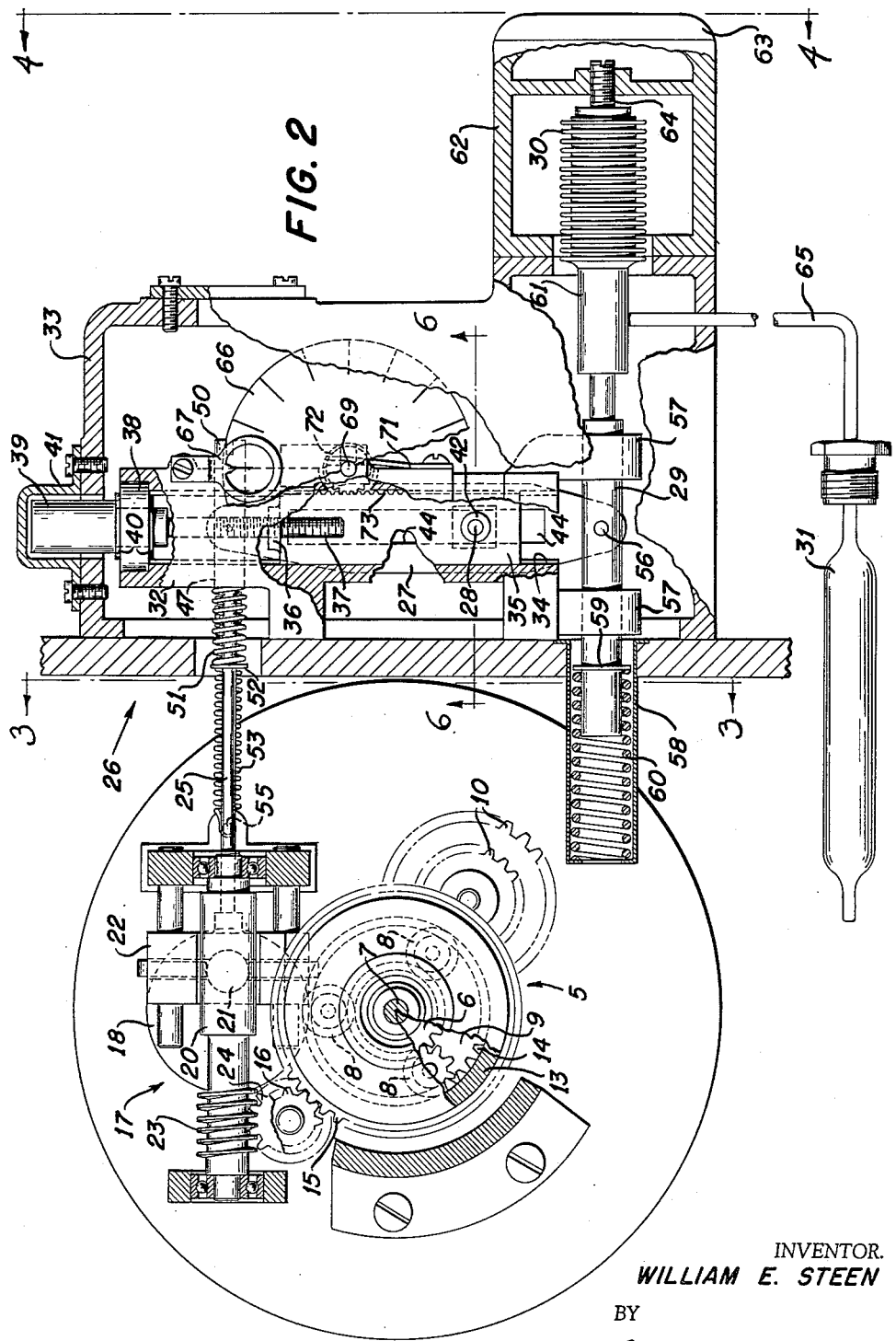

INVENTOR.
WILLIAM E. STEEN
BY
Andrus & Stark
Attorneys 3,088,317
Patented May 7, 1963

3,088,317
TEMPERATURE AND COEFFICIENT EXPANSION COMPENSATORS FOR LIQUID FLOW RECORDERS
William E. Steen, South Pasadena, Calif., assignor to A. O. Smith Corporation, Milwaukee, Wis., a corporation of New York
Filed Feb. 15, 1960, Ser. No. 8,813
5 Claims. (Cl. 73—233)

This invention relates to a temperature and coefficient of expansion compensator for liquid flow recorders and is particularly directed to a temperature actuated pivotal coupling to continuously adjust a variable transmission inserted between a liquid flow meter and a recorder. The pivotal coupling adjusts the drive ratio in accordance with the temperature of the liquid flowing through the meter.

In transmitting gasoline and similar liquids from and into bulk stations and the like, pipe lines are now widely employed. To record the flow of liquid into or out of the storage unit, suitable liquid flow meters, normally of the volumetric variety, are inserted in the pipe lines to automatically record the volume of flow. A volumetric responsive flow meter establishes a mechanical output in accordance with the actual volume of liquid flow through the meter.

The volume of the liquid varies with the temperature of the liquid due to the expansion and contraction of a liquid with temperature. Further, the amount of expansion and contraction for any given temperature change is different for many liquids which are carried by the pipeline and thus through the meter. Generally the amount of volumetric change with temperature is directly related to the specific gravity of the material.

Correction means may be inserted between the mechanical output of the meter and the recording device to change the ratio of the meter output with the temperature and the specific gravity of the material flowing through the meter in order to establish a universal recording system. For example, the United States Patent No. 2,291,883 discloses coupling means to automatically compensate for temperature changes. Manual adjustment in the coupling means establishes correction in accordance with the specific gravity of the liquid flowing through the device. As more fully disclosed in that patent, a variable transmission couples the recording device to the meter. A temperature actuated coupling automatically adjusts the degree of coupling of the ratio transmission by angularly positioning a pivotal transmission control lever in response to temperature changes.

To adjust for the specific gravity of the liquid, a manual adjustment moves the pivot point of the control lever and thus regulates the change in the coupling for any given pivotal movement in the lever. The degree of change in the transmission system as a result of temperature changes varies in accordance with the setting of the pivot point. By suitable calibration of the manual setting, the operator adjusts the pivot point in accordance with the known specific gravity of the material being transmitted.

To maintain precise control of the variable transmission, the temperature actuated coupling must be constructed to eliminate lost motion and the like.

The present invention is directed to a readily constructed coupling having essentially no lost motion even after long periods of use.

In accordance with the present invention, the temperature actuated coupling includes a pivotal positioning lever adapted to adjust the position of a variable transmission. One end of the pivotal lever is connected to a control member of the variable transmission and the opposite end is connected to a reciprocating temperature-positioned rod moving perpendicularly to the pivotal axis of the lever in response to changes in the temperature of the metered fluid. The movement of the lever adjusts the transmission to vary the drive of the recorder by the meter in accordance with temperature changes. The connection of the lever to the transmission is resiliently biased to load the lever.

The pivot position of the lever is adjusted in accordance with the specific gravity of the liquid flowing through the unit. The pivot for the lever is carried by a movable carriage having a rack portion constantly held in gear with a position recording pinion. A spring means resiliently biases the pinion into engagement with the rack portion to spring load the carriage and to hold the pinion in close mesh with the rack.

The pinion drives a specific gravity graduated dial which is mounted to allow the operator to accurately and quickly position the pivot in accordance with the specific gravity of the material flowing through the device.

The resilient loading of the lever and the carriage eliminates looseness and backlash and allows accurate positioning of the carriage. Further, the movement of the lever in response to temperature changes is accurately transmitted to the variable transmission.

The present invention provides a temperature and specific gravity compensating coupling which maintains accurate movement for long periods of time.

The drawings furnished herewith illustrate the best mode presently contemplated for carrying out the invention.

Figure 3:
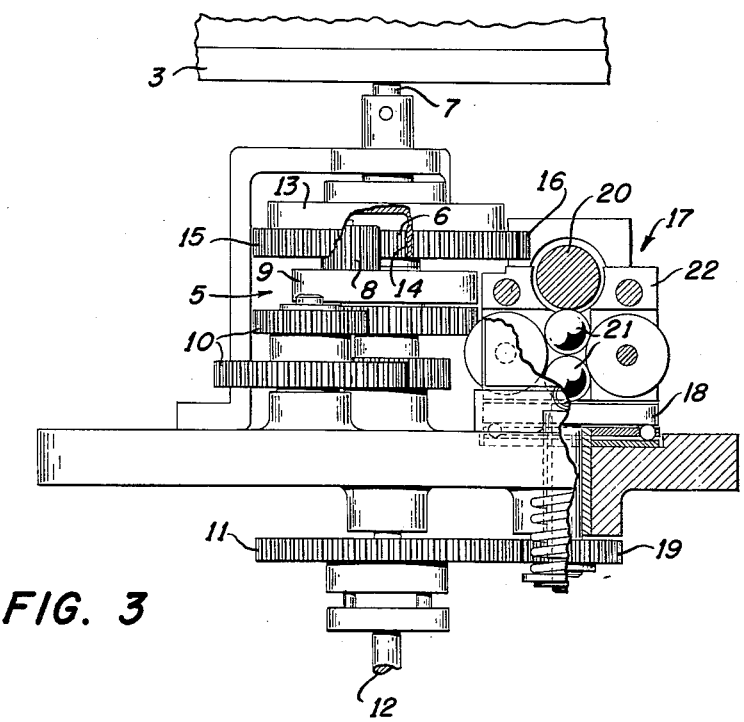
Figure 4:
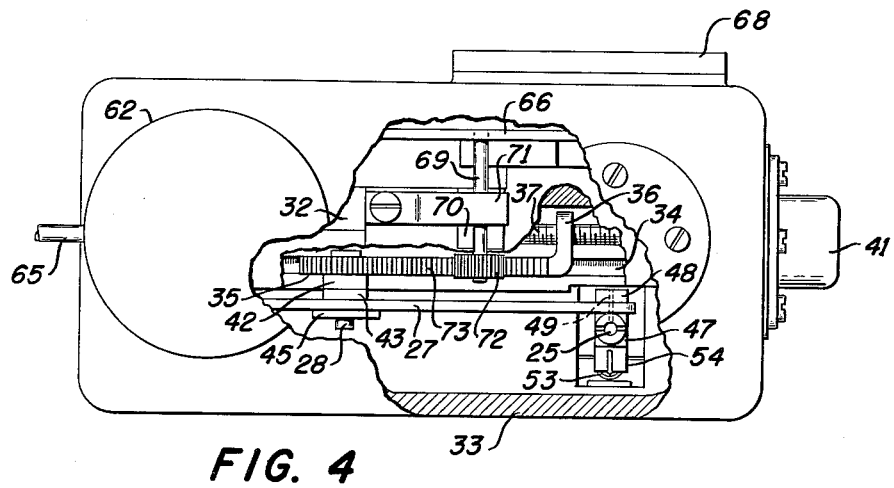
Figure 5:
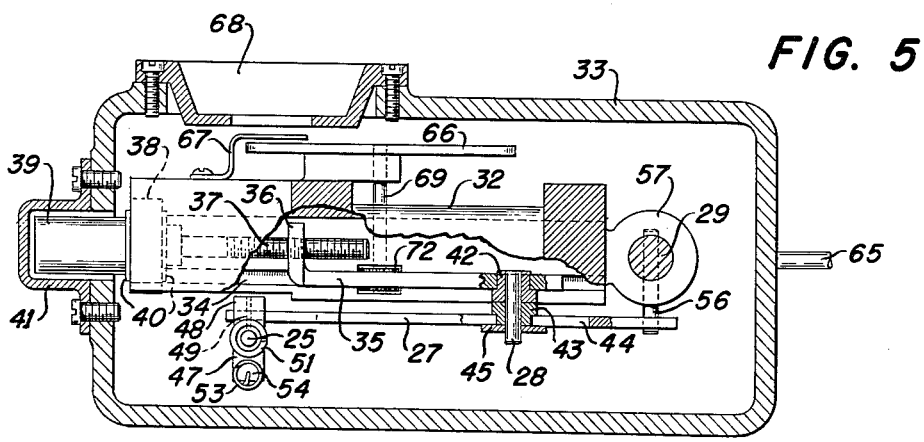
Figure 6:
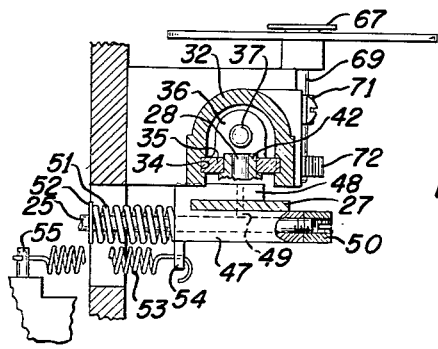

In the drawings:
FIG. 1 is an elevational view of a liquid flow meter adapted to drive a recorder through a compensator constructed in accordance with the present invention;
FIG. 2 is an enlarged top view of the compensator connected between the meter and the recorder with parts broken away to show inner details of construction;
FIG. 3 is a side elevational view taken on the line 3—3 of FIG. 2;
FIG. 4 is a side elevational view of the pivotal lever connection between a temperature compensating means and a ball integrator taken on line 4—4 of FIG. 2;
FIG. 5 is an opposite side elevational view of the pivotal lever connection shown in FIG. 4; and
FIG. 6 is a fragmentary view of the pivotal connecting means taken on line 6—6 of FIG. 2.

Referring to the drawings and particularly to FIG. 1, a liquid transfer line 1 is illustrated which is adapted to carry liquids of different specific gravities. A meter 2 is connected in series in the line 1 and is adapted to establish a rotational output in proportion to the volume of the liquid passing through the meter. A recorder or other registering apparatus 3 is mounted on top of the meter 2 and connected through an adjustable ratio drive 4 to the output of the meter 2. The adjustable ratio drive 4 is adapted to automatically establish temperature compensation and includes a manual adjustment means for changing the ratio of the drive in accordance with the specific gravity of the fluid flowing through the meter 2.

The meter 2 is any standard volumetric responsive meter; for example, as shown in U.S. Patent 2,362,778 to W. E. Steen and no further specific description or illustration is given. Similarly, the recorder 3 is of any standard construction and no further description is given.

The adjustable ratio drive 4 includes a planetary or differential transmission 5, shown in FIGS. 2 and 3, which is automatically adjusted to compensate for temperature changes of the liquid in line 1.

The illustrated planetary transmission 5 is of a conventional construction including a sun gear 6 connected by a shaft 7 to drive the recorder 3. A similar construction is shown and more fully described in applicant's copending application entitled "Variable Ratio Transmission" filed on even date and assigned to common assignee herewith. Generally, a set of planetary gears 8 are carried by a yoke 9 in constant mesh with the sun gear 6. A gear train 10 couples the yoke 9 to an input gear 11. An output shaft 12 from meter 2 is coupled to drive gear 11 and thus the yoke 9 in accordance with the volume of flow through the meter 2. A ring gear 13 is journaled for free rotation about the shaft 7 and has internal gear teeth 14 meshing with the planetary gears 8. External gear teeth 15 are provided on the outer periphery of the gear 13. Referring to FIG. 2, an output gear 16 meshes with the external gear teeth and is coupled to the input gear 11 by a ball integrator transmission 17 to drive ring gear 13. The sun gear 6 is driven as the difference in the speed between the yoke 9 with the attached planetary gears 8 and the ring gear 13 in accordance with the standard operation of a planetary transmission.

The illustrated ball integrator transmission 17 is an adjustable ratio drive and is more fully described in the above referred to copending application. The transmission 17 is herein described only to the extent necessary for a complete and clear understanding of the present invention.

Generally, transmission 17 includes a driven disc 18 which is coupled to input gear 11 by a gear 19. An output roller 20 is mounted diametrically of the disc 18 and in axially spaced relation thereto. A pair of transmission balls 21 are mounted within a tubular opening in a cage 22 and disposed to couple disc 18 to roller 20. Rotation of disc 18 is transmitted to the balls 21 and thus to the roller 20 through the frictional forces between the respective components. A worm 23 is integrally formed on an extension of roller 20 and drives a worm gear 24 secured to a common shaft with the output gear 16 to drive ring gear 13. The speed of the roller 20 is directly proportional to the radial position of the balls 21. Consequently, by selective positioning of the balls 21, the drive ratio between the output of meter shaft 12 and the ring gear 13 is changed.

The cage 22 for the balls 21 has an integral rod 25 extended radially of disc 18 and connected to a temperature compensating assembly 26 to continuously position the cage 22 in accordance with the temperature of the liquid flowing through meter 2.

Referring to FIGS. 2–5, the compensating assembly 26 generally includes a pivoted lever 27 intermediately pivoted upon a pivot shaft 28. One end of lever 27 is coupled to the rod 25 and the opposite end is coupled to a spring-loaded rod 29. A bellows 30 is secured to one end of rod 29 and coupled with a temperature sensing bulb 31. The bulb 31 is disposed in line 1 and causes bellows 30 to expand and contract as the liquid in line 1 expands and contracts. The movement of bellows 30 actuates the rod 29 to pivot lever 27 and reposition the cage 22 and balls 21.

Referring particularly to FIGS. 2 and 4–6, the assembly 26 includes a housing 32 having a U-shaped cross-section mounted within an outer shell 33 of the ratio drive 4. Housing 32 extends perpendicularly to the rod 25 and has longitudinal slots 34 formed on the inner wall surfaces to slidably receive a carriage 35 for movement perpendicular to rod 25. A lug 36 is welded or otherwise rigidly secured to one end of the carriage 35 and is threaded to receive a shaft 37 which positions the carriage 35 within the housing 32. The shaft 37 is supported by a bearing 38 and extends outwardly through an opening in shell 33. A manual control knob 39, shown in FIGS. 2 and 5 is secured to the outer end of the shaft 37. Snap rings 40 are secured to the shaft 37 on opposite sides of the bearing support 38 to prevent axial movement of the shaft. Consequently rotation of shaft 37 moves the carriage 35 within the slots in the housing 32. A removable cover 41 is bolted to the shell 33 overlying the knob 39 to prevent unauthorized adjustment of shaft 37 and the attached carriage 35 and to prevent entrance of foreign matter.

The pivot shaft 28 is secured to the innermost end of the carriage 35 by a supporting hub 42 which is press fitted or otherwise secured to the carriage. The pivot shaft 28 extends laterally of the carriage 35 and outwardly of the housing 32. A hub 43 is secured to the outer end of the pivot shaft 28 and has its outer diameter reduced to receive the lever 27. A central slot 44 is provided in lever 27 corresponding in width to the outer reduced end of hub 43. A snap ring 45 projects into a recess in the pivot shaft 28 immediately outwardly of hub 43 and lever 37 to releasably secure the lever between the ring 45 and the shoulder on hub 43. The slot 44 permits movement of the carriage 35 and the attached pivot shaft 28 independently of the lever 27.

The one end of the lever 27 is coupled to the ball cage rod 25 in the following manner. Referring particularly to FIGS. 3 and 6, a sleeve follower 47 is journaled onto the outer end of rod 25 and includes an offset lug 48 defining an opening for lever 27. A small pin 49 passes through aligned openings in the lug 48 and lever 27 to interlock the lever 27 to the follower 47. A lock nut 50 threads onto the outer end of rod 25 and adjustably secures the follower 47 to rod 25. A coil spring 51 encircles rod 25 between the inner end of follower 47 and a shoulder 52 formed on rod 25 to continuously bias the follower 47 outwardly into firm engagement with the lock nut 50. The coil spring 51 thus operatively couples the lever 27 to rod 25 for positioning of rod 25 in accordance with pivoting of lever 27. The lock nut 50 is employed to zero the meter without disturbing the setting of lever 27 as subsequently described. Thus, turning of lock nut 50 merely repositions the cage rod 25 without moving the sleeve follower 47. A coil spring 53 is secured to a second lug 54 on the follower 47 opposite the lug 48 and to a stationary pin 55 which is secured within a stationary wall member adjacent the ball integrator transmission 17. Spring 53 is somewhat lighter than spring 51 and is stressed to continuously load the lever 27 and bias the rod 25 toward the integrator transmission 17.

The opposite end of the lever 27 is pinned by a pin 56 to the spring-loaded rod 29. Suitable bosses 57 project from the adjacent end of housing 32 to slidably support the rod 29 for perpendicular reciprocation with respect to the lever 27. One end of rod 29 projects into a housing 58 and includes a flange 59 which engages and compresses a biasing spring 60 within housing 58. Spring 60 continuously biases the rod 29 outwardly to pivot lever 27 in a counterclockwise direction as viewed in FIG. 2.

The bellows 30 is secured to the opposite end of the rod 29 by a coupling member 61 and constitutes a movable stop for rod 29. The bellows 30 is a standard expansible member and is housed within a tubular housing 62 which is secured to shell 33. The housing 62 includes a removable end cap 63 establishing access to a threaded stop member 64 engaging the back wall of bellows 30. The stop member 64 prevents outward movement of the bellows and the expansion and contraction of the bellows 30 is reflected in a corresponding movement of rod 29. The stop member 64 is initially positioned to move lever 27 until the slot 44 is parallel with the movement of carriage 35 with the temperature sensitive bulb 31 subjected to a base temperature, normally 60° F., to which the readings are to be corrected.

A small capillary tube 65 connects the temperature sensing bulb 31 in line 1 to the expandable bellows 30 through the coupling member 61.

The bellows 30, capillary tube 65 and temperature sensitive bulb 31 contain a material having a high coefficient of expansion and contraction. Consequently, a slight change in temperature in the liquid in line 1 results in a large change in the volume of the contained material. The bellows expands and contracts as the volume changes and establishes a sensitive mechanical output in response to temperature changes in the liquid being pumped. The rod 29 and the attached end of pivot lever 27 are thus positioned in accordance with the temperature changes. The lever 27 pivots about shaft 28 and proportionately moves the opposite end of lever 27 and the attached cage rod 25. The cage 22 is thereby moved to reposition the balls 21 relative to disc 18 in accordance with temperature changes of the liquid in line 1. The movement of the balls 21 adjusts the drive ratio between the meter 2 and the recorder 3 to compensate for this change in temperature.

As previously noted, different liquids expand and contract differently per unit change in temperature. To compensate for this difference, the shaft 37 is manually actuated to change the position of pivot shaft 28 within the slot 44 in the lever 27. Changing the pivot shaft location correspondingly changes the relative angular movement of the opposite ends of the positioning lever 27 and consequently, the amount the cage shaft 25 shifts incident actuation of the temperature responsive bellows 30.

Referring particularly to FIGS. 2 and 4–6, a dial 66, graduated in specific gravity units, is mounted within the shell 33. A stationary pointer 67 is provided for precise reading of the dial. A small window 68 in shell 33 permits viewing of the dial 66.

The dial 66 is secured to a shaft 69 which is journaled within a recessed boss 70 in the housing 32. A leaf spring 71 is secured at one end of the housing 32 and the free end engages the outer surface of shaft 69 to resiliently maintain the shaft rotatably journaled within the recess. A pinion 72 is secured to the opposite end of shaft 69 and meshes with a rack portion 73 formed on the adjacent portion of the carriage 35. a small opening 74 is provided in housing 32 to allow the pinion 72 to mesh with rack portion 73. Movement of the manual control knob 39 to position the carriage 35, causes the pinion 72 to rotate and reposition the attached dial 66 relative to pointer 67. The graduations on the dial 66 accurately correspond to the positioning of the pivot shaft 28 for the various specific gravity materials.

The operation of the illustrated embodiment of the invention is described as follows:

The bulb 31 is subjected to a liquid held at a base or reference temperature to which correction is to be made. The stop member 64 of bellows 30 is positioned to align the slot 44 with the movement of carriage 35.

The cover 41 is removed and carriage 35 positioned by rotating the shaft 37 until the dial 66 shows the pivot shaft to be located in accordance with the specific gravity of the liquid to be metered.

The bulb 31 is thus mounted within the transfer line 1 to subject the bulb to the temperature of the liquid moving through the line 1 and the meter 2.

As the temperature of the liquid varies, the bellows 30 expands and contracts to angularly displace the lever 27 and adjust the integrator transmission 17. The drive ratio applied to the planetary differential transmission 5 changes accordingly and adjusts the reading of the registering apparatus 3 to the base temperature.

The coil spring 53 and the leaf spring 71 resiliently load the connections and pivot mounting of lever 27 to eliminate backlash and lost motion.

The present invention thereby provides an automatic compensator connection which is very sensitive and accurate over extended periods of use. The structure is easily and quickly adjusted in accordance with the liquid being metered.

Various modes of carrying out the invention are contemplated as within the scope of the following claims particularly pointing out and distinctly claiming the subject matter which is regarded as the invention.

I claim:

1. In a variable drive control having a temperature sensing device coupled to the liquid to adjust an element in a variable drive connection of a metering and recording apparatus for changes in temperature in the liquid flowing through the meter, which comprises a pivotal lever, a movable carriage carrying a pivot support for the lever for positioning of the pivot support relative to the lever, means connecting one end of the lever to the temperature sensing device for angular positioning of the lever, an adjustment member adapted to be secured to the element of the variable drive connection, a sliding follower attached to the lever and slidably engaging said adjustment member, resilient means on said member clamping the follower to the adjustment member for simultaneous movement thereof and constituting the operating connection therebetween, and second resilient means secured to said follower to angularly bias the lever against the action of the temperature sensing device, said first and second resilient means loading the connections to the lever to eliminate substantially all backlash and lost motion in the movement of the lever and to establish accurate actuation of said indicator.

2. In a variable drive control having a temperature sensing device coupled to the liquid to adjust an element in a variable drive connection of a metering and recording apparatus for changes in temperature in the liquid flowing through the meter, which comprises a pivotal lever, a carriage carrying a pivot support for the lever, a support block, cooperating bearing projections and slots on said carriage and said block to slidably support the carriage for positioning of the pivot support relative to the lever, pin means connecting one end of the lever to the temperature sensing device for angular positioning of the lever, an adjustment member secured to the variable drive connection, a sliding follower pinned to the lever and slidably attached to the adjustment member, a presetting member adjustably secured to the adjustment member in abutting engagement with said follower, resilient means on said member clamping the follower against the presetting member and operatively interconnecting the follower to the adjustment member for moving the adjustment member in accordance with movement of the lever, said presetting member operating to preset the position of the adjustment member relative to the follower, and second resilient means secured to said follower to angularly bias the lever against the action of the temperature sensing device, said first and second resilient means loading the connections to the lever to eliminate substantially all backlash and lost motion in the movement of the lever and to establish accurate actuation of said indicator.

3. In a control for a variable drive unit connecting a metering and recording apparatus for adjusting an element of the drive unit in response to the output of a temperature sensitive bellows coupled to a liquid flowing through the meter to record liquid flow to a base temperature incident changes in temperature in the liquid flowing through the meter, which comprises a pivotal lever, a resilient means for connecting one end of the lever to the movable element of the variable drive unit and stressed to bias the lever in a predetermined angular direction, said resilient means permitting movement of the element independently of said lever, a supporting housing, a carriage slidably mounted in said housing for movement longitudinally of the lever, a pivot for said lever secured to said carriage and movably journaled within a longitudinal slot in the lever for selective movement with the carriage, pin means for securing the opposite end of the lever to said sensitive bellows, the position of the carriage and attached pivot presetting the ratio of movement of opposite ends of said lever in accordance with a predetermined coefficient of expansion and contraction of the liquid, a coefficient indicator, a drive shaft for said indicator, a pinion on said drive shaft aligned with said carriage, a rack on the aligned portion of the carriage to drive the pinion incident movement of the carriage, said housing having a recess accommodating the shaft, a leaf spring secured at one end to the housing and having the opposite end overlying the shaft and recess to resiliently bias the pinion into engagement with the rack to load the carriage and maintain accurate positioning and indicating of the setting of the pivot, and a preset stop associated with said bellows to align said lever and said carriage when the bellows is subjected to the action of the base temperature.

4. In a control for a variable drive unit adjusting the connection between a metering and a recording apparatus for changes in temperature in the liquid flowing through a meter by a temperature sensing device coupled to the liquid, which comprises a transmission rod adapted to be connected to the drive unit and teminating in a threaded end and having an intermediate stop flange, a stop nut on the end of the rod, a pivotal lever extending generally perpendicularly of said rod, a sleeve journaled on the rod and pinned to one end of the lever, a coil spring encircling the rod between said sleeve and the stop flange on the rod and stressed to hold the sleeve in engagement with the stop nut on the end of the rod, a supporting housing, a carriage slidably mounted in said housing for movement longitudinally of the lever and perpendicular to said transmission rod, a pivot shaft for said lever secured to said carriage for selective movement with the carriage, said lever having a longitudinal pivot slot accommodating the pivot shaft whereby the setting of the carriage and pivot shaft adjusts the ratio of movement of opposite ends of said lever in accordance with the coefficient of expansion and contraction of the liquid, a coil spring secured to said sleeve and stressed to pivot the sleeve and the lever in a direction opposite to said first named coil spring, a rod journaled for movement perpendicularly of the lever and coupled to said temperature sensing device, a pin securing the opposite end of the lever to the rod, a coefficient indicator, a drive shaft mounted perpendicularly to the movement of the carriage and coupled to drive said indicator, a pinion on said drive shaft aligned with said carriage, a rack on the aligned portion of the carriage to drive the pinion incident movement of the carriage, said housing having a recess accommodating the shaft, and a leaf spring secured at one end to the housing and having the opposite end overlying the shaft and recess and being stressed to resiliently bias the pinion into engagement with the rack to load the carriage and maintain accurate positioning and indicating of the setting of the pivot.

5. In a variable drive control for adjusting a metering and recording apparatus for changes in temperature in the liquid flowing through the meter by a temperature sensing device coupled to the liquid, which comprises a pivotal lever, a transmission rod adapted to be connected to the variable drive, a sleeve journaled on the rod and pinned to the lever, spaced stops secured in spaced relation to the outer end of transmission rod and on opposite sides of the sleeve, one of said stop means being adjustably secured to the transmission rod, a resilient means disposed between one of said stops and the sleeve and biasing said sleeve into engagement with the opposite stop, pin means securing the opposite end of the pivotal lever to the temperature sensing device for pivoting the lever in accordance with temperature changes, a carriage movably supporting the pivot of said lever, a support block, cooperating bearing projections and slots on said carriage and said block to slidably support the carriage, means to selectively position said carriage, an indicator to establish the position of said carriage, a pinion supported by a shaft and secured to drive the indicator, a rack secured to the carriage for simultaneous movement therewith, resilient means supporting said pinion shaft to maintain said pinion in resilient engagement with said rack, and resilient means secured to said lever to angularly bias the lever against the action of the temperature sensing device, said resilient means loading the connections to the lever to eliminate all backlash and lost motion in the movement of the lever and to establish accurate actuation of said indicator.

References Cited in the file of this patent

UNITED STATES PATENTS

| 2,208,687 | Renfrew | July 23, 1940 |
| 2,414,596 | Griffith | Jan. 21, 1947 |
| 2,942,497 | Berck | June 28, 1960 |

FOREIGN PATENTS

| 56,896 | Austria | June 15, 1912 |